May 27, 1952     T. G. SMITH     2,598,022
FIRE HOSE
Filed May 10, 1946
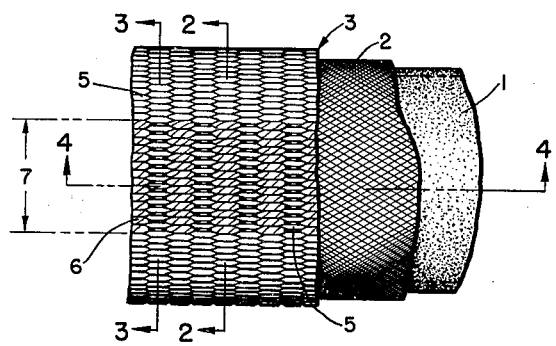
FIG. 1
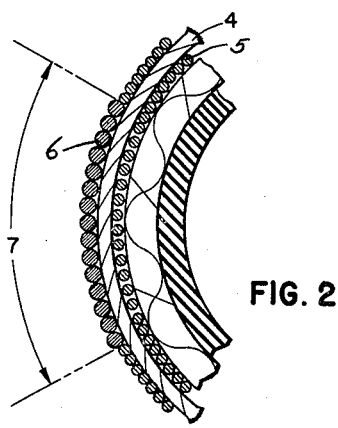
FIG. 2
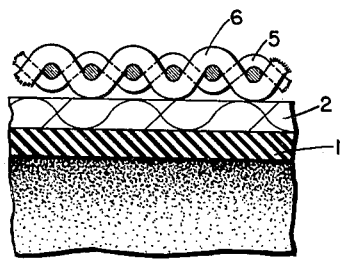
FIG. 4
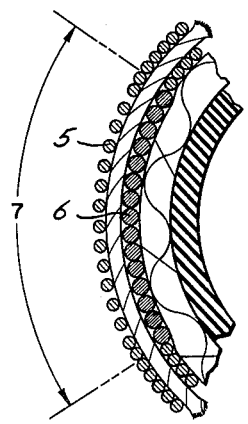
FIG. 3
FIG. 5
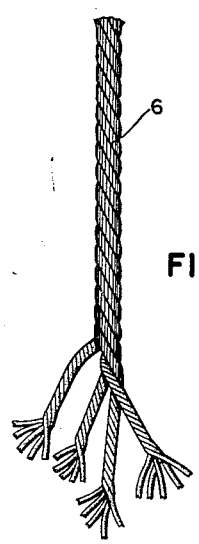
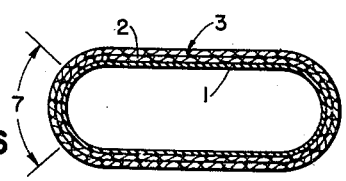
FIG. 6    FIG. 7
INVENTOR.
THOMAS G. SMITH
BY Patented May 27, 1952

2,598,022

UNITED STATES PATENT OFFICE 2,598,022

FIRE HOSE

Thomas G. Smith, Cuyahoga Falls, Ohio, assignor to Wingfoot Corporation, Akron, Ohio, a corporation of Delaware Application May 10, 1946, Serial No. 668,844

10 Claims. (Cl. 138—53)

The present invention relates to hose and, particularly, to the type known as fire hose and it has for its principal object the provision of a cover for the hose which is more wear resistant at the edges where greatest abrasion takes place and which, at the same time, is so constructed as to permit bending of the hose when the hose is coiled.

Another object of this invention is to provide at the lateral edges of a relatively flat section hose a cord construction which permits additional flattening of the hose during the coiling operation so as to prevent excessive kinking, the construction being such as to also provide for additional wear resistance at the edges of the hose.

These and other objects will become more apparent as the description of the invention proceeds.

In the drawings, Fig. 1 is a fragmentary edge elevation of a fire hose constructed in accordance with my invention.

Fig. 2 is a fragmentary section taken substantially along the line 2—2 of Fig. 1.

Fig. 3 is a fragmentary section taken substantially along the line 3—3 of Fig. 1.

Fig. 4 is a longitudinal fragmentary section taken substantially along the line 4—4 of Fig. 1.

Fig. 5 illustrates the twisted cord used in the outer cover.

Fig. 6 illustrates the cabled cord used in the outer cover, and

Fig. 7 is a transverse cross-section taken through the hose.

Fire hose is generally made with a relatively flat cross-section as shown in Fig. 7 and comprises in the present instance an inner layer 1 of rubber molded substantially to the shape illustrated with the upper and lower portions substantially flat and joined by the arcuate edge portions. An intermediate cover 2 is preferably bonded to the rubber 1. An outer protective layer 3 is preferably not bonded to the layer 2 although it snugly embraces same in order to prevent shifting of the layers 2 and 3 relative to each other to any appreciable degree. The outer layer 3 also helps resist the high pressures in the hose. Layers 2 and 3 are generally made of woven cords and, in the present invention, the construction of the inner layer 2 may be of the usual uniform construction, that is the weave is uniform throughout the extent of the fabric. In general, the layer 2 has warp cords, extending longitudinally of the hose, woven around transversely extending weft cords.

The present invention is concerned primarily with the outer or wear-resisting ply which encompasses the two inner layers to protect them from abrasion and to add reinforcement against the high pressures used in hose of this character.

The outer ply of fabric which is indicated generally by the reference character 3 is composed of the transversely extending weft cords 4 and longitudinally extending warp cords 5 and 6, the latter cords being shown more in detail in Figures 5 and 6. The warp cord 5 is a twisted cord of No. 8 yarn with nine strands twisted together. This will be referred to hereafter as an 8—9 cord. The warp cord 6 is a No. 10 yarn twisted in groups of five and then cabled as shown in Fig. 6. This will be referred to hereafter as a 10—5—4 cord. It is to be understood that these specific cords are cited by way of example and are not intended to limit the scope of the invention. The cord 6 should be of larger outer diameter than cord 5 for the purposes hereinafter to be described and this cord 6 which is a cabled cord is thus constructed for the reason that it offers more resistance to wear than does the ordinary twisted cord. Both cords may be cabled or both may be twisted, but it is preferred for the sake of economy that the cord 5 be merely a twisted cord.

The main body of the outer cover is made up of the weft cords 4 and the warp cords 5, but the lateral edges within the areas designated 7 in the drawings are constructed as best illustrated in Figures 1 to 4, inclusive. In these figures, it is clear that the warp cords 5 and 6 alternate with each other and, since the warp cords 5 are less in diameter than the cords 6, they will be more loosely spaced along the weft cords as shown in slightly exaggerated form in Figure 1. Actually, in the finished product, the cords 5 even in the area 7 appear to abut against each other the same as the cords 6; but obviously, since their diameters are different, there is in reality less crowding of the cords 5 than of the cords 6. This is for accomplishing the purposes of this invention which will now be more fully described.

Fire hose is generally coiled and laid on its side in a fire truck or the more usual practice is to merely fold it in a horizontal plane on the floor of the truck. In either case, it is necessary for the hose to bend either to accommodate the hose to the curvature of the coil or to permit the folding of the hose. If such bending is accomplished without kinking, the life of the hose is greatly increased. It is, therefore, an object of this invention to prevent or at least minimize kinking of the hose and, at the same time, provide a substantial wearing surface at the lateral edges which edges are subject to abrasion when the hose is dragged over the floor of the truck or over the pavement when the hose is pulled from the truck to be attached to a hydrant.

This increased wearing surface is provided by the cords 6 which, due to their cabled construction, are more wear resistant and, by alternating the smaller cords 5 with the cords 6, it is possible to coil the hose much more readily than when the outer cover is woven uniformly as in the usual construction. This construction provides what may be termed a hinging action for the cover. When the hose is coiled, it is obvious that, if the lateral edges of the hose were very stiff, that difficulty would be encountered in coiling the hose and kinking would occur. Kinking results in sharp creases in the warp cords and, in time, this would tend to destroy them. If, on the other hand, the lateral edges are relatively flexible, the coiling can be accomplished with little, if any, kinking because of the yieldability of the material to accommodate itself to the different radii of the outer and inner portions of the hose with respect to the center of the coil.

With the construction described, it will be obvious that, when the hose is coiled, there is a flattening of the hose in a vertical direction viewing the hose as in Fig. 7. This requires the collapsing of the outer edges to prevent any substantial kinking of the hose and, due to the fact that the smaller cords 5 are interspersed between the cords 6, the former cords act as pivots about which the latter and larger cords may pivot; whereas, if the cords were all of the same size, there would be more of a tendency to jam up against each other. The smaller cords 5 provide more room or clearance on the inner side of the hose as shown in Fig. 2 and, therefore, enable the hose to bend more readily. As viewed in Fig. 3, the larger cords are shown on the inside of the weft cords and are shown as abutting against each other. Actually, they are not abutting against each other with as much firmness as they would if the cords 5 were not interspersed therebetween in the weaving process; and, consequently, the hose can bend and compress the cords 6 to a greater extent than if the cords 5 were not interspersed therebetween.

Also, in the coiling operation, there is a tendency for the warp cords on the inner side of the coil to become compressed longitudinally and for the outer cords to be stretched. Actually, very little stretching of these cords can take place and, as a consequence, the rest of the cover must compress longitudinally. If the cords are all of the same diameter when this compression takes place, there would be a jamming of the cords against one another to resist the coiling operation. But, since the cords 5 at the edge are spaced more than the cords 6, a space is provided into which portions of the cords 6 may enter, doing away with the resistance to compression at the inner side of the area 7. This gives a good hinging action about a line extending circumferentially of the hose.

Furthermore, the soft, twisted cords are more compressible than the cabled cords and, as the hinging action takes place, these twisted cords yield to make room for the cabled cords. In another sense, the cabled cords may be said to indent the twisted cords as the hinging action takes place. While the invention is not limited to any particular relative diameter of cords, there should be an appreciable difference in their diameters. The larger cord should preferably be at least about 20 percent more in diameter than the smaller cord and, in the example given herein, the larger cord has a diameter which is approximately 40 to 42 percent greater than that of the smaller cord. The diameters referred to are the diameters of the cord when not under lateral compression.

To sum up the invention, it is pointed out that the use of alternate small and large longitudinal cords, whether cabled or twisted, will provide for a better hinging action about a line parallel with the cords, as well as about an axis perpendicular thereto. Of course, in practicing this invention, the entire outer cover could be made the same as the area 7; but, due to the use of the more expensive cabled cord 6 in such a construction, the resultant cost would be too great for the advantages to be obtained from the more flexible cover. It is also obvious that, if desired, the layer 2 of fabric may be made the same as the outer cover to increase the flexibility of the hose. Preferably, the outer cover 3 is not permanently united to the cover 2 but is woven snugly thereabout to provide a reinforcement for the hose against the high pressures within the hose. It is also possible to practice this invention by adhering the outer cover to the inner cover only at the upper and lower portions of the hose as viewed in Figure 7, thus leaving the edge portions free to provide a better hinging action when the coiling of the hose takes place.

The particular embodiment of my invention which I have shown and described is not to be considered as limiting my invention except as may be hereinafter set forth in the claims hereunto appended. Obviously, other arrangements and combinations may be employed within the purview of the invention.

Having thus fully described my invention, what I claim and desire to secure by Letters Patent of the United States is:

1. A hose comprising a flexible tubular portion, and a cover for said portion comprising weft cords and warp cords, the alternate warp cords in at least a section of said cover being of different diameters to increase the flexibility of that portion of the cover.

2. A device as set forth in claim 1 in which the smaller warp cords are of twisted yarn and the larger warp cords are of cabled strands of twisted yarn.

3. A hose of the class described comprising an inner flexible fluid conducting portion having a normal cross-section which is substantially flat on two opposing sides joined by arcuate sections to form the lateral edges of the hose, and a fabric cover over said portion and closely embracing same made of laterally extending weft cords and longitudinally extending warp cords, the warp cords lying adjacent the flat sides being of uniform diameter and those adjacent the arcuate lateral edges being of alternately different diameters to increase the flexibility of the cover.

4. A hose of the class described comprising an inner flexible fluid conducting portion having a normal cross-section which is substantially flat on two opposing sides joined by arcuate sections to form the lateral edges of the hose, and a fabric cover over said portion and closely embracing same made of laterally extending weft cords and longitudinally extending warp cords, the warp cords lying adjacent the flat sides being of uniform diameter and those adjacent the arcuate lateral edges being of alternately different diameters to increase the flexibility of the cover, the larger of the warp cords in the edges being 10-5-4 cabled cords and the smaller warp cords being 8-9 twisted cords.

5. A hose of the class described comprising an inner flexible fluid conducting portion having a normal cross-section which is substantially flat on two opposing sides joined by arcuate sections to form the lateral edges of the hose, and a fabric cover over said portion and closely embracing same made of laterally extending weft cords and longitudinally extending warp cords, the warp cords lying adjacent the flat sides being of uniform diameter and those adjacent the arcuate lateral edges being of alternately different diameters to increase the flexibility of the cover, the larger of the warp cords in the edges being approximately at least 20 percent greater in diameter than the smaller cords.

6. A device as set forth in claim 1 in which the spaced warp cords of different diameters are arranged only in diametrically opposed sections of said cover.

7. A hose comprising a reinforcing layer having warp threads extending longitudinally thereof and weft threads holding said warp threads in substantially parallel relation, the warp threads being of alternately larger and smaller diameters in at least a portion of the periphery of said hose to increase the flexibility of that portion of said hose.

8. A hose comprising a flexible tubular portion having weft cords and substantially parallel warp cords, some of the warp cords being of a small diameter and others thereof being of a larger diameter in one portion of the cover, pairs of the larger warp cords each having a smaller warp cord arranged therebetween in abutting engagement therewith whereby to keep the larger cords from being jammed against each other and thus permit hinging action about the smaller cord.

9. A device as set forth in claim 8 in which the spaced warp cords of different diameters are arranged only in diametrically opposed sections of said cover.

10. A device as set forth in claim 8 in which the smaller warp cords are of twisted yarn and the larger warp cords are of cabled strands of twisted yarn.

THOMAS G. SMITH.

REFERENCES CITED

The following references are of record in the file of this patent:

UNITED STATES PATENTS

| Number | Name | Date |
|---|---|---|
| 1,727,762 | Frederickson | Sept. 10, 1929 |
| 1,747,584 | Howard | Feb. 18, 1930 |
| 2,007,918 | Morse | July 9, 1935 |
| 2,009,075 | Thomson | July 23, 1935 |
| 2,146,275 | Thompson | Feb. 7, 1939 |
| 2,329,836 | Huthsing | Sept. 21, 1943 |
| 2,472,484 | Krippendorf | June 7, 1949 |